Sept. 3, 1957 E. MATTSON 2,804,820
HOLE PUNCHING DEVICE FOR HAY BALERS
Filed May 25, 1954 3 Sheets-Sheet 1

Emil Mattson
Inventor
by Fisher & Christen,
Attorneys

Sept. 3, 1957 E. MATTSON 2,804,820
HOLE PUNCHING DEVICE FOR HAY BALERS
Filed May 25, 1954 3 Sheets-Sheet 2

Emil Mattson
*Inventor* by *Fisher & Christen,*
*Attorneys*

Sept. 3, 1957  E. MATTSON  2,804,820
HOLE PUNCHING DEVICE FOR HAY BALERS
Filed May 25, 1954  3 Sheets-Sheet 3
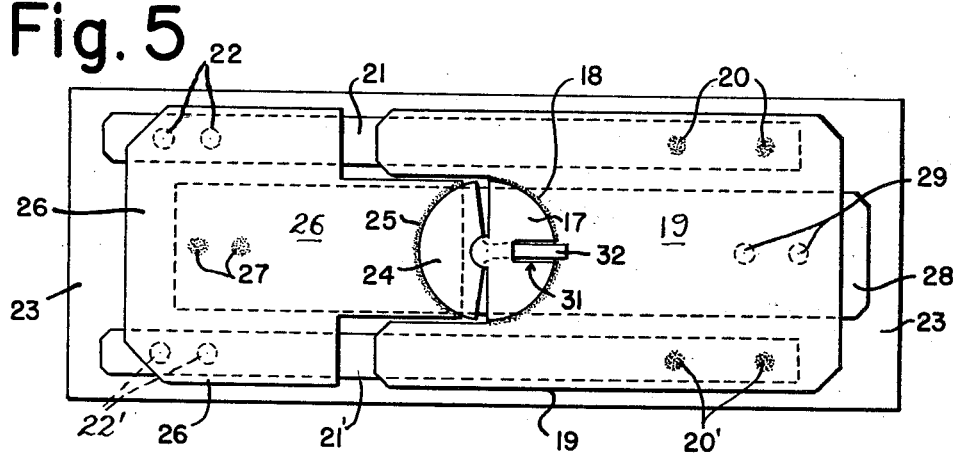
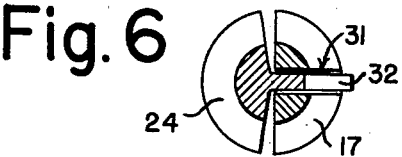
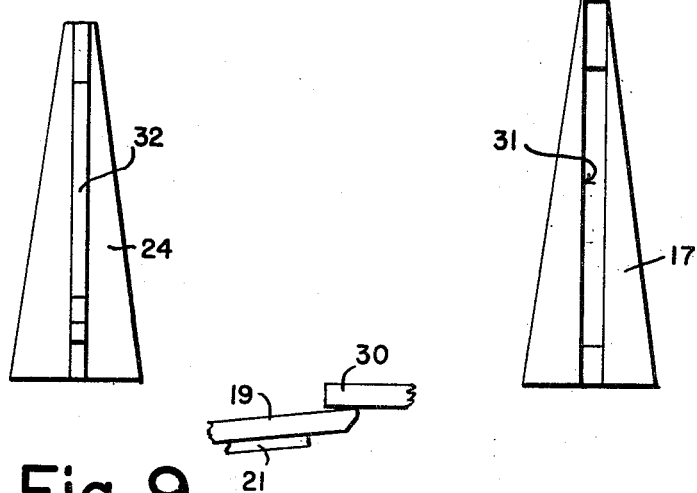
Emil Mattson
Inventor
by Fisher & Christen
Attorneys

United States Patent Office 2,804,820
Patented Sept. 3, 1957

2,804,820
HOLE PUNCHING DEVICE FOR HAY BALERS

Emil Mattson, Chester Depot, Vt.

Application May 25, 1954, Serial No. 432,103

4 Claims. (Cl. 100—98)

This invention relates to improvements in hay balers by which a hole is formed longitudinally through the bale as the latter is being compressed. This hole permits normal ventilation, without forced air circulation, throughout the usually compact interior of the bale; greatly decreasing the danger of spoilage and of spontaneous combustion, and permitting the baling of greener or damper hay. This increased tolerance to the condition of the hay adds to the length of the working day, since baling can be continued into the evening even if dew is falling, and can be started earlier in the morning before waiting for the hay to become completely dry.

Besides the tying mechanism, which is not of importance here and which will therefore not be described, the usual hay baler comprises a compression plunger which forces the hay into a baling chamber where the hay is tied in bales and fed through, and an infeed plunger which takes the loose hay supplied by a conveyor mechanism and feeds it in front of the compression plunger. In accordance with the present invention the compression plunger is provided with a forwardly tapered projection, preferably conical, which with each forward stroke forms a short hole in the bale being formed. The repeated short holes made as the bale is being formed merge into a continuous hole extending completely longitudinally through the bale. In the preferred form the tapered projection is made expansible, so that it not only punches a conical hole but thereafter compresses in an outward direction the hay surrounding it to give the walls of the hole a greater stability.

The invention will now be described with reference to the accompanying drawings, in which Fig. 1 is a diagrammatic side view of one standard hay baler showing the device of my invention in place, the compression plunger being shown at the start of its compression stroke;

Fig. 5 is an end view of the form of device shown in Fig. 3;

Fig. 6 is a section on line 6—6 of Fig. 3;

Fig. 7 is a detail of one of the hole punching parts looking from the right in Fig. 5;

Fig. 8 is a detail of the other hole punching part looking from the right in Fig. 5; and Fig. 9 is a detail showing a stop engaging a portion of the cone mounting.

Figure 1:
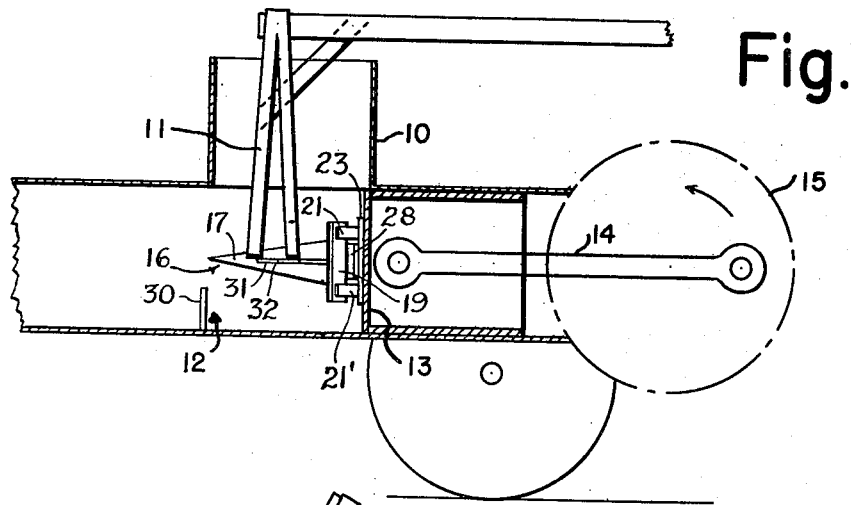
Figure 2:
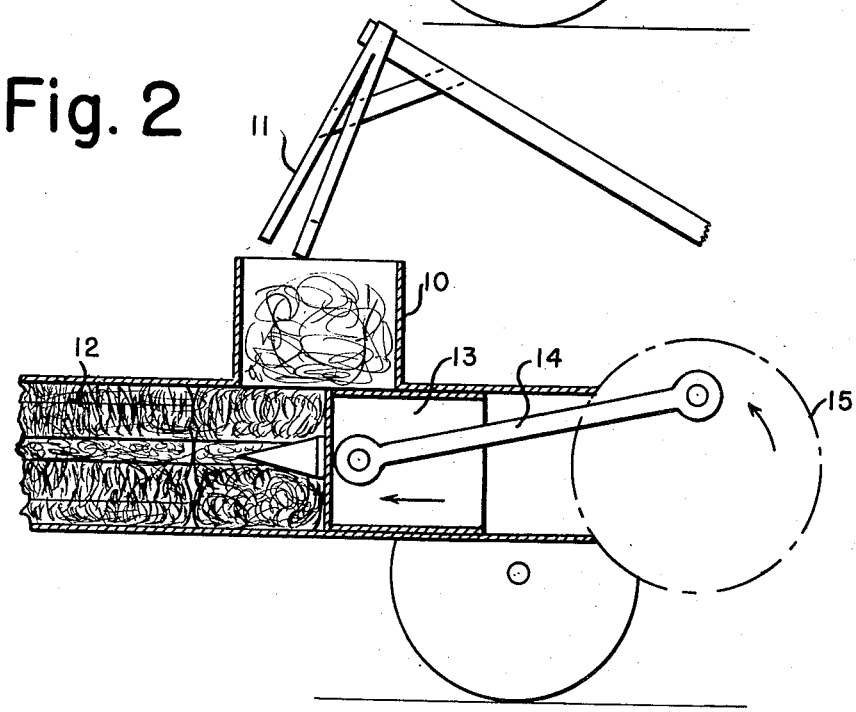
Fig. 2 is a similar view with the compression plunger at approximately half way along its stroke and showing a solid cone.
Figure 3:
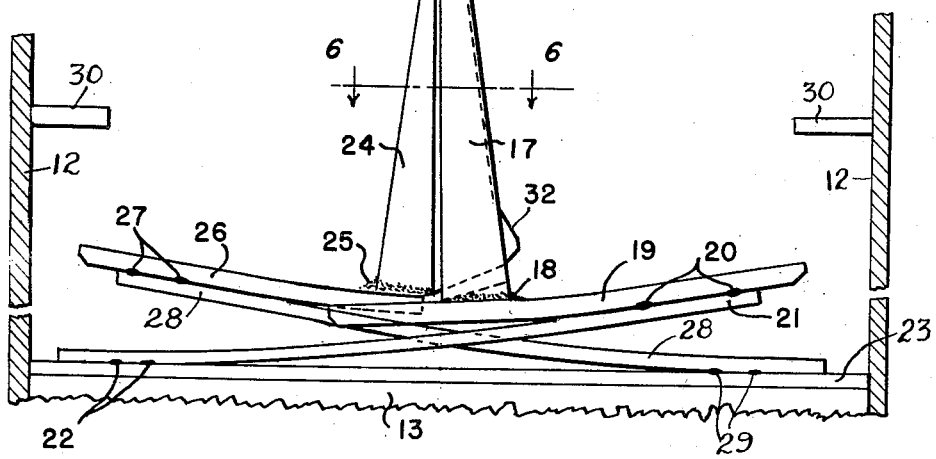
Fig. 3 is a side view, on an enlarged scale, of a preferred form of the hole punching device, the device being shown with its parts in the relation they occupy at the start of the compression stroke.
Figure 4:
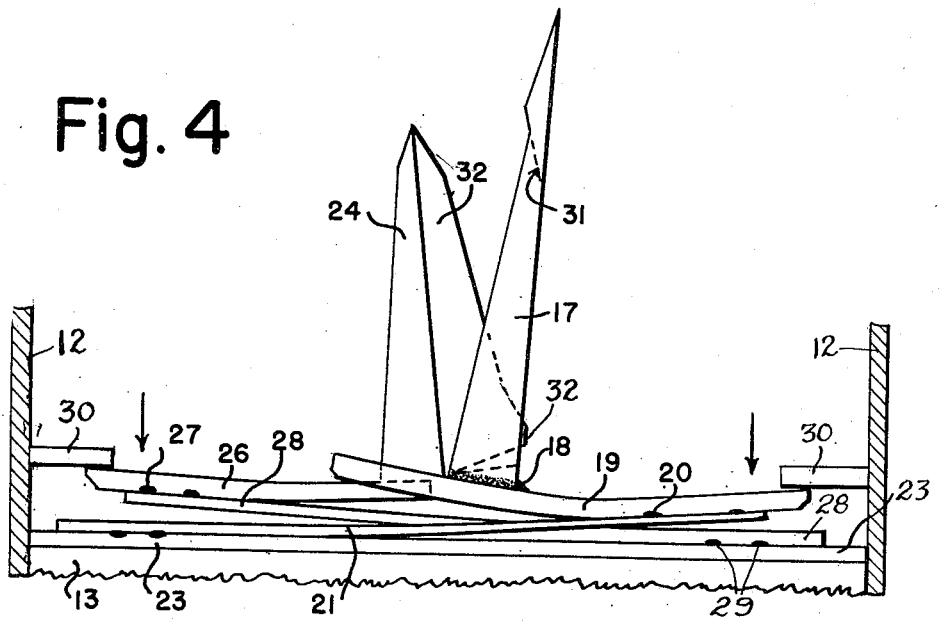
Fig. 4 is a similar view with the parts in the positions they occupy at the end of the compression stroke.

Referring first to Figs. 1 and 2, the main feed hopper is shown at 10. Hay is fed into this hopper by any suitable conveyor, which has not been illustrated as not being necessary for an understanding of the present invention. This hay is periodically carried downwardly by a reciprocating or oscillating feed arm 11 into the rear end of the baling chamber 12. The baling plunger 13 is here shown conventionally as being operated through a connecting rod 14 from a rotating crank disc 15, and moves periodically back and forth within the baling chamber across the open bottom of the feed hopper. As the hay is forced into the baling chamber beyond the feed hopper it is compressed against the bale previously made by repeated strokes of the baling plunger, which also advances the partially formed bale, as well as all previously formed bales remaining in the chamber, a short distance on each stroke. When the bale has reached the correct length the plunger is temporarily stopped and a knotting mechanism ties the bale lengthwise. The formation of a new bale then proceeds as before.

In accordance with the present invention the face of the baling plunger is provided with means for forming a hole through the bale as the compression of the latter proceeds.

The construction shown in Figs. 1 and 3 to 9 performs this operation and also gives an extra outward pressure to the hay surrounding the hole which is especially desirable. The important novel feature of this invention is that the punch is conical and is made in two parts and these two parts are repeatedly forced apart laterally as the punch advances to compress and compact the hay around the hole so as to make the hole more permanent and not likely to collapse My method of compressing the hay has the advantage of making the bale more stable around the hole, and stretching the hole outward, larger, since pressure is exerted throughout the whole length of the cone on each stroke, whereas the solid cone can exert pressure only near its base. The cone has a main part 17 secured as by welding 18 to a pedal 19 fastened as by bolts or welding 20 to a pair of leaf springs 21' welded or bolted at 22' to a plate 23 secured in any suitable manner to the face of the baling plunger 13. The mating part 24 of the cone is secured as by welding 25 to a pedal 26 fastened by bolts or welding 27 to a leaf spring 28 welded or bolted as at 29 to the plate 23. As the plunger advances, the pedals strike either the end of the partially formed bale or an abutment 30 (Fig. 9) secured to a fixed part of the baler. The reaction thus set up to the continued forward movement of the plunger and shown by the arrows in Fig. 4 causes the two parts of the cone to separate as will be seen from a comparison of Figs. 3 and 4.

In order to keep the two parts of the cone in alignment, and in addition to clear from between the two parts any hay that may have gotten in while they were separated, the part 17 is provided with a slot 31 and the part 24 with a tongue 32 which remain in sliding contact at all times and present a wedge-shaped gap which, as it closes, will force any entrapped hay out towards the point of the cone.

The above described form of cone has the advantage of making the bale somewhat more stable around the hole, since pressure is exerted throughout the whole length of the cone on each stroke, whereas the solid cone, Fig. 2, can exert pressure only near its base.

What I claim is:

1. In a hay baling press, having a baling chamber and a baling plunger reciprocable therein, for compressing hay in said chamber, a substantially conical projection carried by said plunger and having a pointed end portion extending forwardly of the plunger to project into the baling chamber to form a hole in the hay being compressed, said conical projection being divided into two sections normally lying side by side in a closed position, and leaf springs carried by the plunger and extending laterally thereof with respect to its direction of travel, one end of each of the several springs being secured to the plunger, the other ends of the springs being respectively secured to said two sections of said conical projection, for urging said sections toward said closed position, and means operative upon movement of the plunger against the hay in the baling chamber for causing the two portions of the conical projection to spread apart to compress the hay around the hole outwardly.

2. In a hay baling press comprising a baling chamber adapted to receive loose hay, and a baling plunger reciprocable therein and having a forward face for compressing said loose hay to form a bale, a conical projection carried by the plunger for penetrating the loose hay, said projection extending into the chamber and away from said forward face and divided into separable sections normally lying side by side, and means for separating the sections laterally as the plunger advances to form a hole in the center of a bale being compressed and to compress the hay around the hole outwardly and for stretching the hole larger after penetrating all the way through the loose hay.

3. In a hay baling press comprising a baling chamber adapted to receive loose hay and a baling plunger reciprocable therein and having a forward face for compressing said loose hay to form a bale, a conical projection carried by the plunger for penetrating the loose hay, said projection extending into the chamber and away from said forward face and divided into two separable sections normally lying side by side in a closed position, and two sets of leaf springs having outer ends secured to said forward face of the plunger and extending forwardly of said forward face into the baling chamber; said springs having inner ends secured respectively to the two sections of the projection for urging said sections toward said closed position, and means operative upon movement of the plunger against hay in the baling chamber for causing the sections to move apart.

4. In a hay baling press having a chamber for receiving hay to be baled, a baling plunger reciprocable therein, a two-part projection carried by the plunger, each part having a base portion and a pointed portion said pointed portions defining complementary sections of a cone, the pointed portions projecting into the baling chamber to form a hole in the hay being baled, leaf spring means extending transversely of the direction of travel of the plunger, each spring being anchored at one of its ends to the plunger, each spring being secured at its other end to the respective base portions of said parts, said springs normally acting to bring together the pointed portions of the projection to form a cone, a fixed abutment in said chamber, said base portions being adapted to engage said projections and the hay being baled and thereby to laterally expand the two pointed portions of the cone to compact outwardly the hay around the hole made by said conical projection.

References Cited in the file of this patent

UNITED STATES PATENTS

| | | |
|---|---|---|
| 674,596 | Bridges et al | May 21, 1901 |
| 1,376,568 | Nolen | May 3, 1921 |
| 2,413,522 | Russell | Dec. 31, 1946 |